United States Patent
Owurowa et al.

(10) Patent No.: US 9,554,124 B1
(45) Date of Patent: Jan. 24, 2017

(54) IMAGE DISPLAY WITH FULL-DEPTH VIEWING

(71) Applicant: EOS Vision, Inc., Scottsdale, AZ (US)

(72) Inventors: Fori Owurowa, Scottsdale, AZ (US); John H. Prince, Los Altos, CA (US)

(73) Assignee: EOS VISION, INC, Scottsdale, AZ (US)

( * ) Notice: Subject to any disclaimer, the term of this patent is extended or adjusted under 35 U.S.C. 154(b) by 237 days.

(21) Appl. No.: 14/466,990

(22) Filed: Aug. 23, 2014

Related U.S. Application Data

(63) Continuation-in-part of application No. 14/173,756, filed on Feb. 5, 2014.

(51) Int. Cl.
 *H04N 13/04* (2006.01)
(52) U.S. Cl.
 CPC .................. *H04N 13/0404* (2013.01)
(58) Field of Classification Search
 CPC .................................................. H04N 13/0404
 USPC .......................................................... 348/59
 See application file for complete search history.

(56) References Cited

U.S. PATENT DOCUMENTS

| | | | | |
|---|---|---|---|---|
| 5,499,138 | A * | 3/1996 | Iba ....................... | G02B 3/0043 345/8 |
| 2002/0054428 | A1* | 5/2002 | Seward ................. | G02B 6/4206 359/362 |
| 2006/0038114 | A9* | 2/2006 | Cofer ..................... | F16P 3/14 250/221 |
| 2009/0160757 | A1* | 6/2009 | Robinson ............... | G09G 3/003 345/102 |
| 2010/0208041 | A1* | 8/2010 | Savvateev .......... | G02B 27/2207 348/51 |
| 2012/0182407 | A1* | 7/2012 | Yoshida ............. | G02B 27/2214 348/54 |
| 2012/0188238 | A1* | 7/2012 | Kean .................. | G02B 27/2214 345/419 |
| 2013/0321406 | A1* | 12/2013 | Harrold ............... | G02B 6/0011 345/419 |
| 2013/0321720 | A1* | 12/2013 | Inada .................. | G02B 27/225 349/15 |
| 2014/0153818 | A1* | 6/2014 | Lanfranchi ........ | G02B 27/2214 382/154 |
| 2014/0192407 | A1* | 7/2014 | Greenberg ............. | G02B 21/22 359/385 |
| 2015/0334379 | A1* | 11/2015 | Du ..................... | H04N 13/0497 348/51 |

\* cited by examiner

*Primary Examiner* — Christopher S Kelley
*Assistant Examiner* — Zhihan Zhou
(74) *Attorney, Agent, or Firm* — File-EE-Patents.com; Jay A. Chesavage

(57) ABSTRACT

A full depth display for use in three dimensional (3D) imaging has an array of optical emitters on a first plane, an aperture array having a plurality of apertures on a second plane separated from the first plane, and an optional set of corrective lenses which direct the image to a slightly divergent path about the z axis. The optical emitters are organized in left/right pairs. The aperture array contains periodic structures which direct optical energy from the array of apertures to an observer's left and right eyes to create the effect of a full depth image.

20 Claims, 10 Drawing Sheets

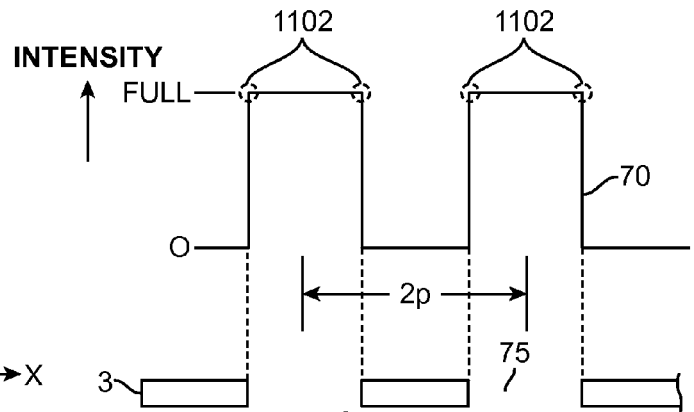
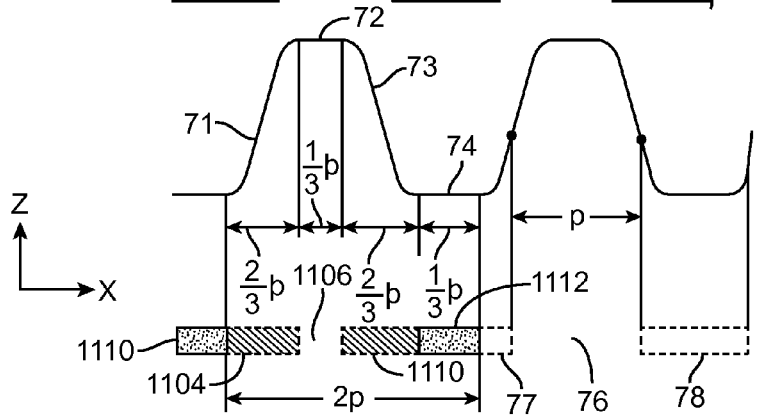
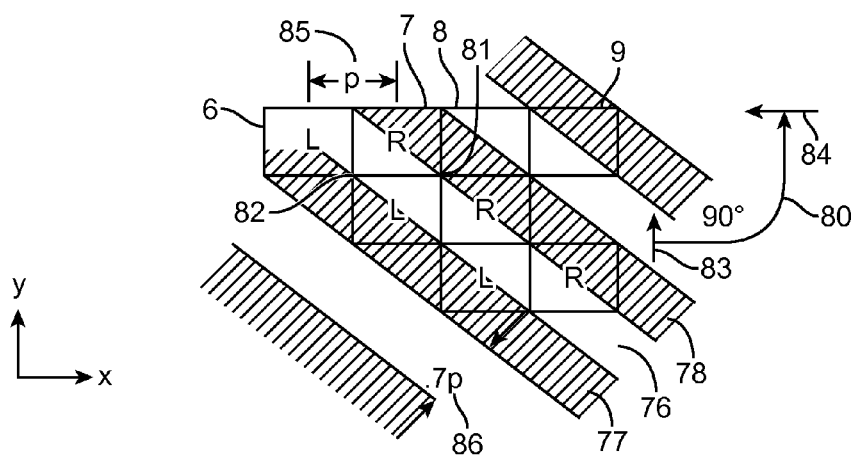
FIG. 11A
FIG. 11B
FIG. 11C
FIG. 11D
FIG. 12

IMAGE DISPLAY WITH FULL-DEPTH VIEWING

The present patent application is a continuation in part of Ser. No. 14/173,756 filed on Feb. 5, 2014.

BACKGROUND OF THE INVENTION

The capture of images for full depth (3D) viewing can be done with multiple coordinated imaging devices, and most frequently with just two. Presently, and for the most part, these images are stored, manipulated and then re-created as multiple images for viewing on flat screens. To see the images in full-depth, observers using prior art systems typically wear switching, polarized or anaglyph glasses. With varying degrees of success this has been done for many years. What has been done with much more difficulty is to re-create the images without the use of viewing glasses, and more difficult still to do this without converting from capture to display format in milliseconds, that is, in real time.

Within the field of directly viewing full-depth 3D images without viewing glasses (auto-stereoscopy), a number of techniques have been used to re-create full-depth images from flat screens. The most successful of these has been lenticular arrays, in which each cylindrical lens creates multiple points of view by bending the light from several LEDs, giving, in aggregate, an observer a vivid sense of depth. This is especially true at "sweet spots", where a confluence of beams arrive in close coincidence.

A different technique physically divides the light from the emitting elements into left and right with small strips, so that each eye sees just one half of the full perspective. These are called "parallax barriers". They have long been used, but are generally limited to just two points of view. Efforts to make them work well include liquid crystals, active barriers, reversed barriers and multiple barriers.

Another approach is a rear projection system with multiple points of view, possibly hundreds. This replicates the way we see scenes with our eyes, acquiring a great number of image snapshots from different perspectives to create full depth panoramas in our visual cortex. This approach requires as many cameras and as many projectors as there are points of view to recreate. These cameras and projectors must all be carefully coordinated both in capture and display. Even small failures, such as those of intensity or color balance, in any camera or projector will leave streaks in the display. For so many imaging devices storage requires considerable memory and streaming substantial bandwidth. Nonetheless multiple projectors can produce full-depth and full-parallax images of great quality.

Another technique using MEMS structures, utilizes tiny flipping solid-state mirrors to guide light through narrow-angle screens to create images of differing viewpoints.

DESCRIPTION OF THE RELATED ART

In the field of painted images, renaissance artists used tricks of light and perspective to create full-depth effects by focusing a viewer's interest on the main subjects of their compositions. One example are paintings of Mary holding the baby Christ (e.g. Georges de la Tour, 1644). In this and similar pictures the baby Christ is brightly lit, attracting the one's attention to Him, with onlookers receding into a darkening background. Today, with high-speed computers, a viewer's attention can be convincingly redirected to different parts of an action in milliseconds, mimicking the action of our eyes, giving us a full-depth effect. This process is called foveation, since the attention of the eye is drawn to the action by its most sensitive element, the fovea, and all the rest is reduced to peripheral (or less noticed) vision.

In the field of still images and moving images, for the past century cinematographers have also used the separation of colors, in their simplest division of blue and red, to redirect the different perspectives, for example, blue to the left eye and red to the right. The viewer uses glasses typically called anaglyph, since the spectrum is carved away at its blue and red extremes to minimize color (and image) overlap. This inexpensive technique is still used, though most viewers find the color differences presented to their two eyes somewhat disconcerting.

Almost a century ago another technique was introduced called parallax barrier in which the "blue" and "red" (in this case different perspectives) were separated in viewers' eyes by the parallax (or viewing) angle. In the 1990s Sharp Electronics Corporation developed an electronic flat-panel application of this technology to commercialization, briefly selling laptops with the world's only 3D LCD screens. Parallax barrier screens are still used but appear dark and generally have a limited viewing angle.

A later technique, developed in the 1980s, was to use a system of cylindrical lenslets slanting at an angle close to 33° to the screen vertical, and with a number of separate perspectives (typically from four to nine for each lenslet) to create a full-depth effect. This technology has been very successful in advertising and signage. The screens are very bright, and the images can appear to come straight out at a viewer to give the viewer a brilliant effect of a product. These screens work since viewers are typically at some distance from the screens (optimally at 4 meters) and do not see the low resolution near the screens, where pixels are used up by the multiple perspectives. A viewer also has to be optimally situated in angle (at one "sweet spot" of several) for the full depth illusion to occur and for the viewer to see the screen in full depth.

Since the cylindrical lenslet approach has been successful, attempts have been made to "convert" (or write to) the screens in real time. This conversion in real-time has had to overcome internal software obstacles, and to date has not been successful. Presently, moving signage images are created frame by frame by a programmer using image processing software and a computer. Consequently, computer-generation (CG) is a lengthy and expensive process.

A typical prior art glasses-free (or directly-viewed) signage screen is optimally of a size between 24 inches and 48 inches. Because of the particular alignment of the optics, the screen cannot be manufactured in other sizes without redesigning the associated optics. The plastic lenslets are fragile and must be carefully wiped for cleaning, and the lens inclusions are difficult to clean. To preserve optical alignments, the system has significant internal structural supports, and as a consequence, the display is heavy. A typical unit cost is $10,000, which is a price point barrier to universal acceptance by consumers.

It is desired to provide direct viewing of full depth images using a conventional 2D TV or monitor screen which can be modified inexpensively to display full-depth images in real-time, using conventional image processing electronics and software. It is further desired to provide a full depth imaging system with a lightweight screen.

It is also desired to provide a full-depth image display in the form of an attachable device which can be attached and removed from a conventional flat screen or monitor so that full-depth viewing can be performed inexpensively.

SUMMARY OF THE INVENTION

The present invention provides a method and apparatus for full depth (3D) viewing of image pairs using a plurality of imaging picture elements (pixels) on an optionally planar first surface, an aperture array which is centered on a second surface which is a substantially uniform separation distance from the first surface, and optionally, a series of condensing optical elements which are a substantially uniform separation distance from the second surface. Each pixel is an array of optical emitters, one part of which generates optical energy directed to an observer's left eye, and another part of which generates optical energy directed to an observer's right eye. For a tri-stimulus RGB full depth display, each pixel may be arranged as a series of repeating optical emitter elements, each in the form $R_{LT}R_{RT}G_{LT}G_{RT}B_{LT}B_{RT}$ where subscript "LT" indicates an element presenting optical energy to a viewer's left eye and "RT" indicates an element presenting optical energy to a viewer's right eye. Alternative arrangement of repeating optical emitters forming a pixel could be $R_{LT}G_{RT}B_{LT}R_{RT}G_{LT}B_{RT}$, each pair of "RT" and "LT" subscript emitters associated with an aperture. In one alternative embodiment of the invention, each of the "RT" and "LT" optical emitters are monostimulus (for example W or white for black and white image generation) or in another alternative example of the invention, each of the optical emitters are multi-stimulus emitters (such as the tristiumulus RGB for each particular LT and RT emitter, or RGBW, indicating Red, Green, Blue, and White, respectively), with the aperture associated with an "LT" and "RT" multi-stimulus emitter forming the pair of emitters. In one example of the invention, the set of six optical emitters (RGB for each eye) represent a single picture element (pixel), and an N×M full depth pixel display is formed with N vertical columns (in a "y" reference direction) and M horizontal rows of such optical emitters (in an orthogonal "x" reference direction), with an orthogonal "z" direction being the axis to the viewer for reference in the views and description.

The display aperture array is an array of elements which direct optical energy from the "LT" optical source elements to the left eye, and optical energy from the "RT" optical source elements to the right eye. In one example, the display aperture array is in the x-y reference plane and the elements of the display aperture array have a cross section in the x-z plane (perpendicular to the display aperture array x-y plane) and the structure cross section is a repeating pattern of circular or elongate shapes, including any of an oval, ellipse, rectangle, or diamond cross-section of the display aperture array. The gaps between the aperture array elements form three dimensional apertures which serve to reduce penumbra artifacts and minimize the direction of optical energy from a "RT" emitter to a left eye and from a "LT" emitter to a right eye. As described earlier, the pair of optical emitters "LT" and "RT" can be a a single color such that each color required to form an image has a single color emitter pair associated with an aperture, or the optical emitter can be a pair of tristimulus emitters such as RGB associated with an aperture, or the optical emitter can be a pair of 4-color emitters such as RGBW, each associated with an aperture. The display aperture array of elements may be a repeating array of elongate or circular elements aligned in the y axis, or it may be oriented in any angular relationship with respect to the y axis in the x-y plane. In one particular example of the invention, the display aperture array is at substantially 45 degrees of rotation from the y axis in the x-y plane. The display aperture array may be formed as an etched structure which is positioned an aperture array separation distance from the first surface image generation elements, or it may be formed as a transparent plate which rests on the first surface image generation elements.

An optional optical condenser lens, or other optical element which provides parallel or slightly divergent optical paths to the viewer, may be placed on or above the display aperture array surface for redirecting the optical energy emitted from the full depth display.

In one example of the invention, a full depth image display provides for an observer to view a full depth image through a series of apertures to a condensing lens where the sets of left and right image rays from the respective image sources are bent to become parallel or just slightly divergent, by way of modifying a flat or curved planar TV screen, which can thereby simulate the presentation of full-depth images to a viewers eyes by directing two separate images so as to be separately viewed by each eye by means of the geometric arrangement of the optical structures. In this manner, substantially the majority of optical energy emitted by the display is directed to the viewer, creating a viewed full-depth image which is wholly natural. With the arrival of 4K pixel image displays, the images can also be generated to conform to existing standards for high definition (HD) displays.

For the natural re-creation of a scene in full-depth, the alignment, spacing, and shape of the full depth display apertures formed by the gaps between the aperture array elements must be very precise with respect to the optical emitters, as must be the separation of the apertures from the emitting elements, and the separation of apertures from a condensing lens, when present. In one example of the invention for directing the "LT" and "RT" optical energy from the emitters to the respective eyes of the viewer, there may be a series of lenses present in a third surface separated from the second surface of the aperture array. In another example of the invention, the lenses magnify the images to enhance the full-depth effect. In another example of the invention, the apertures are formed on one surface of a planar sheet, with the other surface applied to the emitters, or alternatively the emitters applied to the other surface, with the thickness of the planar sheet thereby forming a separation distance between emitters and aperture array.

The shape of the apertures and their separation distance t to optical emitter elements (such as LEDs) is governed by the requirement to shape light beams and eliminate overlaps associated with cross coupling "LT" optical energy into the right eye and "RT" optical energy into the left eye. For example, to steer the beams from two adjacent emitting elements, the apertures will appear in cross-section (in the x-y plane) as crosses. In a typical full depth display application, the light-beams emitted by the display may cross each other, yet maintain "LT" to left and "RT" to right paths. The corresponding individual aperture elements in a section view perpendicular to the image plane (such as the x-z plane) may be formed using any structure which reduces artifacts, including cross section shapes including diamonds, ovals, rectangles, circles, lines or any combination or variation thereof. In one example embodiment, circles in the x-z plane can be formed using an array of cylindrical forms in the x-y plane, such as by forming the plane in the x-y plane using parallel threads or wires. Cylinders and other shapes can be drawn, deposited, or printed. Precise printing of the aperture array elements can also be performed using a 3D printer.

For large TV screens, a series of lenses for shaping and condensing light may optionally be placed along the third surface a separation distance s from the second surface defining the plane or surface of the aperture array, and the lenses may be any type of shaping or condensing optical structure, including wedge lenses, circular lenses, or Fresnel lenses, which in general are invariant along the y axis, maintaining alignment with the associated optical emitters. For compactness the condensing lenses should be of short focal length, and for appearance, the condensing lenses may have finely divided sub-lenses, or lenslets. The pitch of the lenses may be equal to the pitch p of the individual optical emitters, whereas the pitch of the aperture array elements may be 2p, or twice the pitch of the individual optical emitters.

For steering and shaping light beams, the Fresnel lenses can be linear, whereas for condensing light beams, the Fresnel lenses can be concentric.

The aperture array should maintain a well-defined mechanical relationship with the emitting elements. In one example of the invention, the optical emitter of the first surface, the aperture array of the second surface, and the optional lens structure of the third surface are bonded together to maintain mechanical relationship. In another example of the invention, the aperture array of the second surface and the lens structure of the third surface are bonded together forming a first structure and adjusted for alignment to optical emitters of a second structure, such as by translation and rotation of the first structure with respect to the second structure. In this manner, the second structure may be made attachable and detachable at a small incremental cost compared to the purchase of a complete viewing system.

Given the geometry of an active optical emitting display screen (such as LCD, LED, or plasma emitters, for example), and the mapping of the image array and pitch of the individual optical emitters forming the image array, a screen modifier can be made to retrofit any type of viewing device to convert it into a full depth 3D display.

Accordingly, when upgrades to existing technology are created, old screen modifier assemblies can be quickly and effectively switched out for new without the expense of buying new underlying active emitting screens.

The means of attachment combined with the ability to convert a flat 2D screen to a full depth 3D display screen is one object of the present invention. This applies particularly to newer displays and monitors of any size.

Especially with the increasing resolution of display screens such as UHD, or 4K pixels, the viewing modes of full-depth 3D and flat 2D can be switched back and forth without any physical alteration to a set-up with a single change of screen mapping, while still remaining high-definition (HD) in both modes.

BRIEF DESCRIPTION OF THE DRAWINGS

This invention, with its many further advantages noted below, may be best understood by referring to the following descriptions together with the accompanying drawings, in which like numbers on each drawing page refer to like elements on other drawing pages, and in which:

FIG. 11A shows an intensity plot along the x axis beyond an aperture array.

FIG. 11B shows an aperture array with respect to the intensity plot of FIG. 11A.

FIG. 11C shows an intensity plot beyond a feathered aperture array along the x axis.

FIG. 11D shows the aperture array with respect to the intensity plot of FIG. 11C.

FIG. 12 shows an aperture array rotated in the x-y plane with the aperture pitch adjusted to remain constant in the x axis.

DETAILED DESCRIPTION OF THE INVENTION

Figure 1:
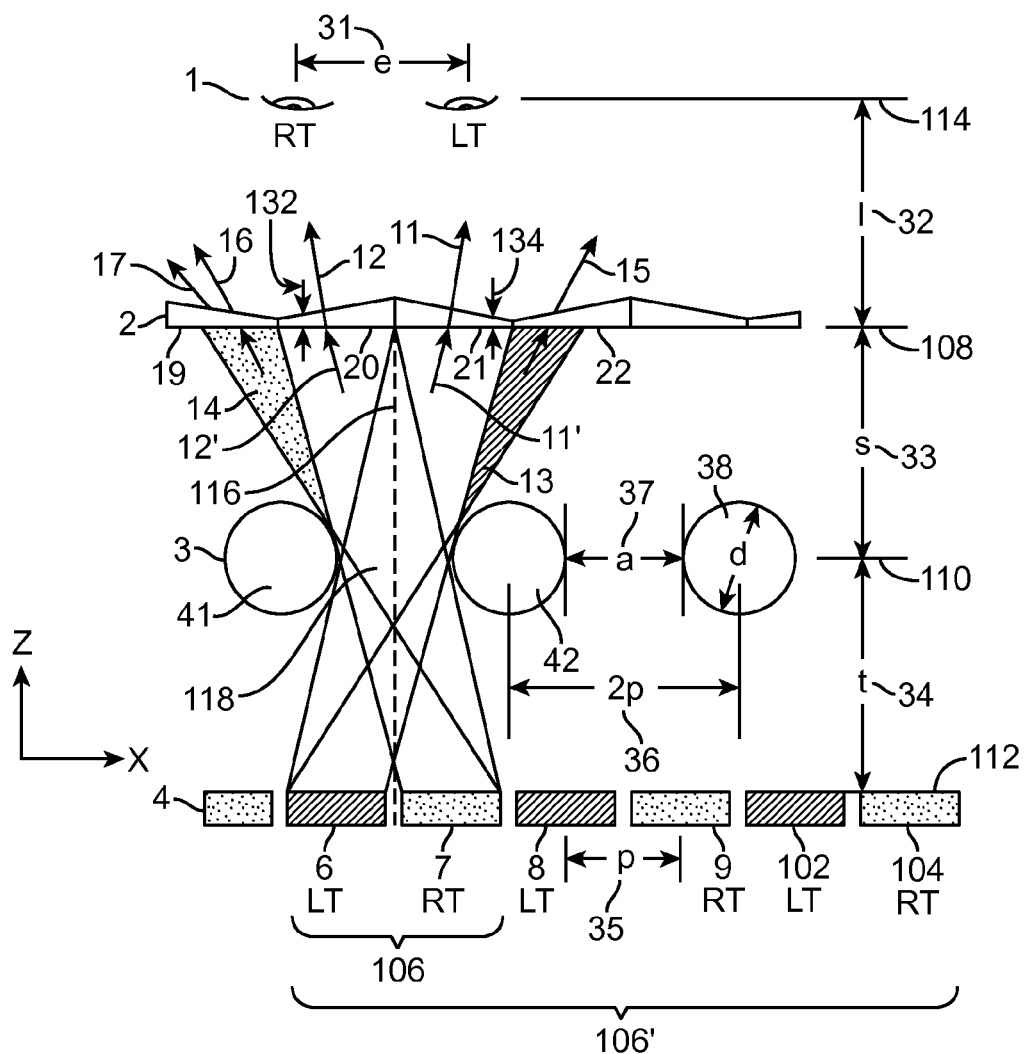
FIG. 1 shows a section view in the x-z (horizontal) plane through a full-depth display in one example of the invention.

FIG. 1 shows an example of the invention for the generation of full depth images by the generation of a stereo pair of images from an array of optical sources 4, where the optical sources 4 are positioned behind an aperture array 3 for isolating generated images which are directed to an observer's left eye from generated images which are directed to an observer's right eye. In the examples to be presented for understanding of the invention, it is useful for computational purposes to describe the structure and geometry using the following symbols, references, and terms:

e 31 is the separation distance between human eyes;

p 35 is the period of the optical source elements, such as an LED array;

2p 36 is the period of the apertures in the case of generating a single stereo pair of images. The stereo pair of images is therefore generated using an aperture array with a period which is twice that of the LED array;

d is the diameter of threads or wires which form the aperture array, with the gaps between the threads or wires forming the apertures. The aperture elements are selected to occlude about half of the aperture;

a 37 is the width of the aperture, normally about the width of an optical source element such as an individual LED. Accordingly a+d=2p. In the simplest case a=d.

l 32 is the distance from the plane of a viewer 114 to an optional condensing lens structure plane 108;

s 33 is the distance from the optional condensing lens structure 108 to the center plane 110 of the aperture array;

t 34 is the distance from the center 110 of the aperture array to the optical source element plane 112.

112 is the optical emitter surface or plane.

110 is the aperture array surface or plane.

108 is the optional lens surface or plane.

114 is the observer plane.

6, 7, 8, 9, 102, 104 are optical emitters. In one example of the invention, a 3D pixel 106 is formed from pairs of RT and LT emitters, each pair such as 6 and 7 associated with an aperture such as 118. In another example of the invention, each emitter is a tri-stimulus emitter, such that the LT optical emitter 6 and RT optical emitter 7 are tristimulus emitters associated with aperture 118.

In an example of the invention where each individual color optical emitter is paired with an associated aperture, an image source element 106' comprises Red LEDs $R_{LT}$ 6 and $R_{RT}$ 7, Green LEDS $G_{LT}$ 8 and $G_{RT}$ 9, and Blue LEDs $B_{LT}$ 102 and $B_{RT}$ 104. Element 106 forms a single picture image element (pixel), as it contains the tristimulus colors directed to the left eye $R_{LT}$ 6, $G_{LT}$ 8 and $B_{LT}$ 102, and the tristimulus colors directed to the right eye $R_{RT}$ 7, $G_{RT}$ 9, and $B_{RT}$ 104, although each of the six constituent elements 6, 8, 102 and 7, 9, 104 is an independently controllable radiating optical source. As will be described, the function of the aperture array 3 is to form apertures 37, 118 between the repeating aperture elements 41, 42, 38, shown in FIG. 1 in cross section as circles. By arranging the aperture 118 midpoint 116 of aperture array elements 41 and 42 such that it aligns with the same midpoint 116 of emitter elements 6 and 7, as well as similarly arranging the midpoints of the other aperture array elements such that they fall on the midpoint between the other radiating elements with subscript LT and RT, respectively, the resultant optical beams can be formed such that the LT subscript radiators direct optical energy to the observer's left eye, and the RT subscript radiators direct optical energy to the observer's right eye. This can be seen in following the beam pattern 12' from source LED 7, which passes through the aperture formed by aperture array elements 41 and 42, and the beam pattern 11' from source LED 6, which is directed through the aperture formed by aperture array elements 41 and 42 to an observer's left eye. It can be seen that each of the pairs of emitters similarly follows the same geometrical pattern, with the aperture formed between a pair of LT and RT subscript emitters being directed to a left and right eye, respectively. Lens array 2 performs the optional function of redirecting the optical energy leaving the aperture array 3 to an angle closer to the incident angle of the observer's eye, and in one example of the invention, the lens array is a linear refraction lens comprising two planar surfaces at an included angle 132,134 to each other. In one example of the invention, the included angle is in the range of 10 to 30 degrees, or in one example of the invention substantially 15 to 23 degrees, with the lens segments centered about an associated aperture and being oriented to decrease the included angle formed by a pair of radiators such as $R_{LT}$ 6 and $R_{RT}$ 7 of FIG. 1.

In an alternative embodiment of the invention, the geometry shown in FIG. 1 utilizes the individual emitters 6, 7, 8, 9, 102, 104 as tristimulus emitters, such that each optical emitter 6 is an RGB (Red, Green Blue) emitter for the left eye, optical emitter 7 is an RGB emitter for the right eye, and each pair of emitters such as 6,7 is associated with an aperture such as 118.

Figure 2:
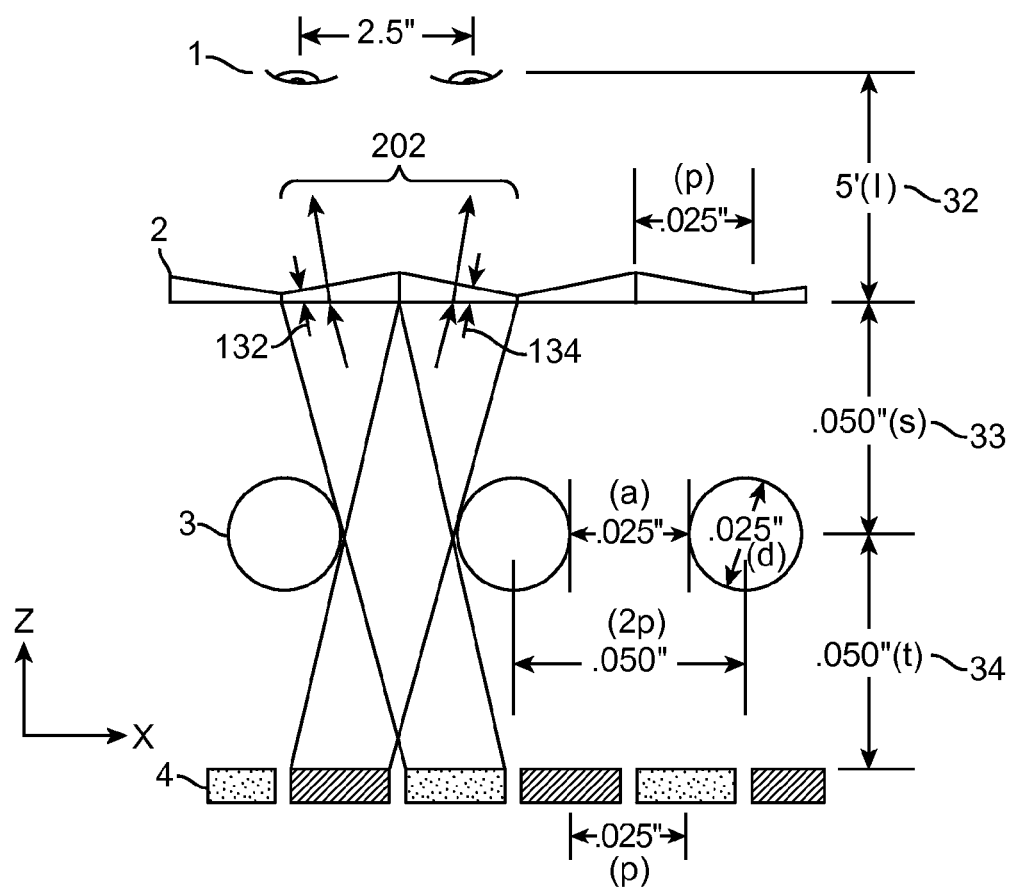
FIG. 2 shows a section view for a dimensioned example of a full depth display derived from a display having a 55" diagonal.

FIG. 2 shows an example full-depth display with the structures of FIG. 1 indicated with dimensions. The dimensions for e (the distance between human eyes) is normally about 2.50 inches (62 mm) and the period between LEDs p (35) on a large 1920×1080 screen (with a 55" diagonal) is 0.025 inches, and the other geometric parameters may be derived from these two essential parameters. Accordingly, the period between apertures 2p (36) is twice that of the LEDs, or 0.050". If the aperture a (37) at 50% opening is 0.025 inch then the diameter d (38) of the wires will also be 0.025 inch because a+d=2p. The aperture is a design variable so (to improve performance) if the value for a could be increased by an exemplar 8% to 0.027 inch, then the wire diameter d would decrease to 0.023 inch.

Additional parameters to consider are the distance S (33) from the lens structure 2 to the aperture array 3. For reasons of symmetry from the LEDs 4, this may be the same as the distance t (34) from the LEDs to the apertures, or S=0.050 inch. To improve performance, the parameter t could be varied, and this adjustment may be accommodated in the final design of the full depth display.

Following the optical path from $R_{RT}$ LED 7 (which is shown as the red LED with light destined for the observer's right eye), the main body of light from $R_{RT}$ LED 7 passes unobstructed through the aperture between elements 41 and 42 of the aperture array 3 to encounter lens 20 of the sequence of wedge lenses 2. The element 20 is a conventional wedge (or prism) and in this example the light enters an angle of 15° to normal and exits at an angle of less than 1° (the wedge's refractive index of 1.5 giving it a wedge angle of 10°). This "main body of light" 12, continues on to the right eye at this small angle of 1° to give a comfortable viewing distance of about five feet.

Following the FIG. 1 path 11' taken by light from $R_{LT}$ (which is shown as the RED LED, but could be any optical emitter 6 such as an tri-stimulus RGB optical source) the main body of light 11' from $R_{LT}$ passes unobstructed through its associated aperture to squarely encounter the element 21 of Fresnel lens 2. This light is also refracted to enter the left eye at the same viewing distance.

As may be seen in FIG. 2, lens 2 is not a cylindrical or spherical lens but a series of linear and opposing wedges (prisms) with the function of directing the light from the LEDs to a comfortable viewing distance, such as parallel to Z or mildly diverging from the z axis with respect to the center of the display. The angled wedge lens feature continues in the y axis throughout the extent of the profile in the x-z plane. The observer can then view the full depth image using light from two different perspectives in a natural manner.

The pixel image format for FIG. 1 with optical wedges invariant vertically (in the y axis) could be:

LRLR
LRLR
LRLR with the pixel source $R_{LT}$ 6, $G_{LT}$ 8, $B_{LT}$ 102 etc. creating the left-eye images and the pixel source $R_{RT}$ 7, $G_{RT}$ 9, $B_{RT}$ 104 etc. creating the right-eye images.

Figure 3:
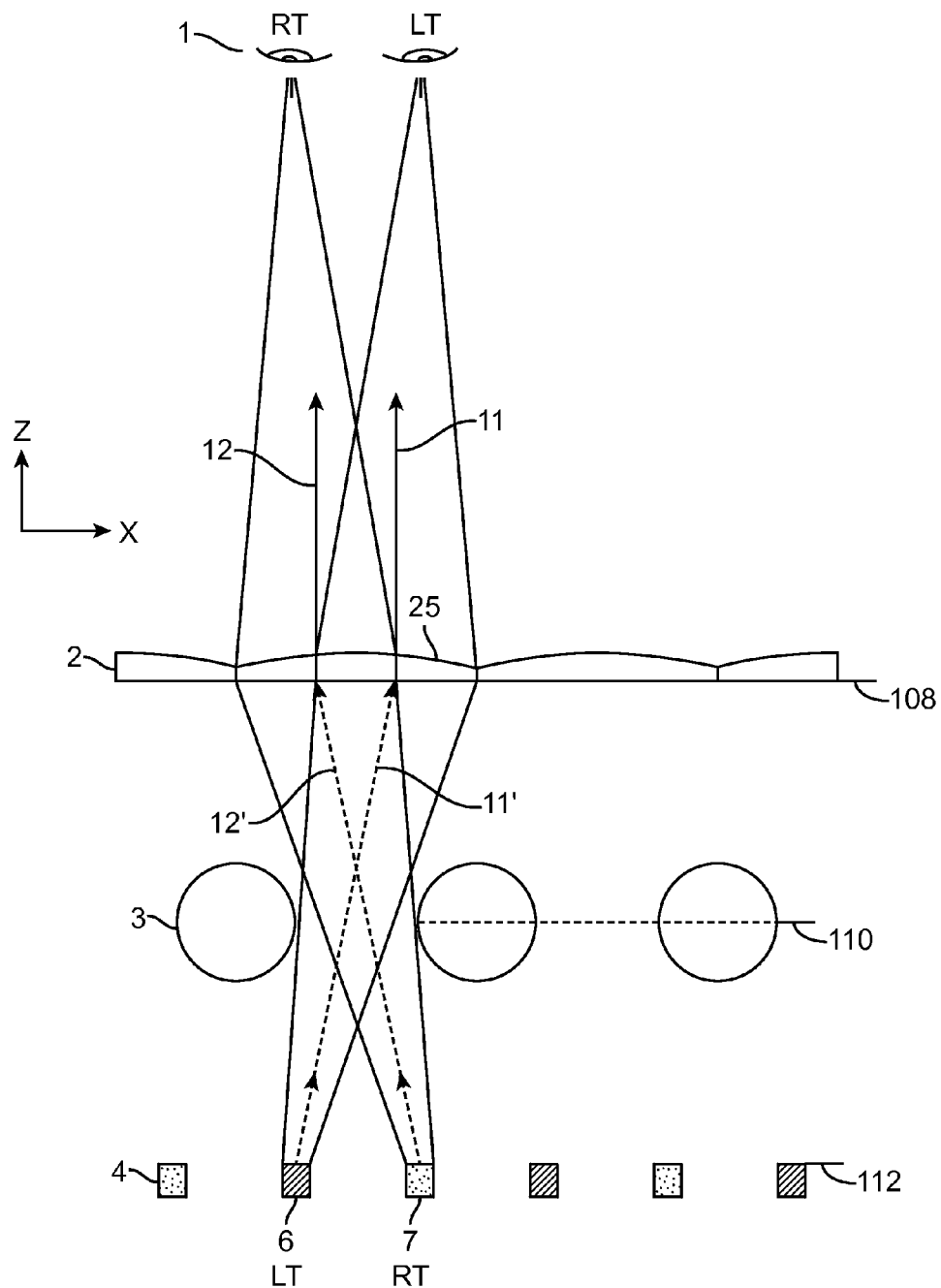
FIG. 3 shows the section view for an example configuration of a screen modifier with apertures combined with lenses.

FIG. 3 is a section view which includes the observer 1 and illustrates merging the series of lens wedges 20 and 21 of FIG. 1 to a series of single cylindrical lenses 25, and also shows the reduction of the extent of optical source LEDs 6 and 7 to point sources. This simplifies the concept of steering the light from these sources to a pair of eyes 1. The principle rays 11 and 12 from LEDs 6 and 7 are shown first as dotted lines 11' and 12', respectively, to the cylindrical lens 25 and then refracted towards the eyes 1 as solid lines. This shows the two rays 11 and 12 clearly separated on reaching the eyes, and the geometrical relationship of the optical sources 6, 7, aperture formed by aperture array 3, and lenses 25 preserves the isolation of LT subscript optical sources such that optical source $R_{LT}$ 6 provides an image source to the left eye and optical source and $R_{RT}$ 7 provides an image source to the right eye.

Figure 4:
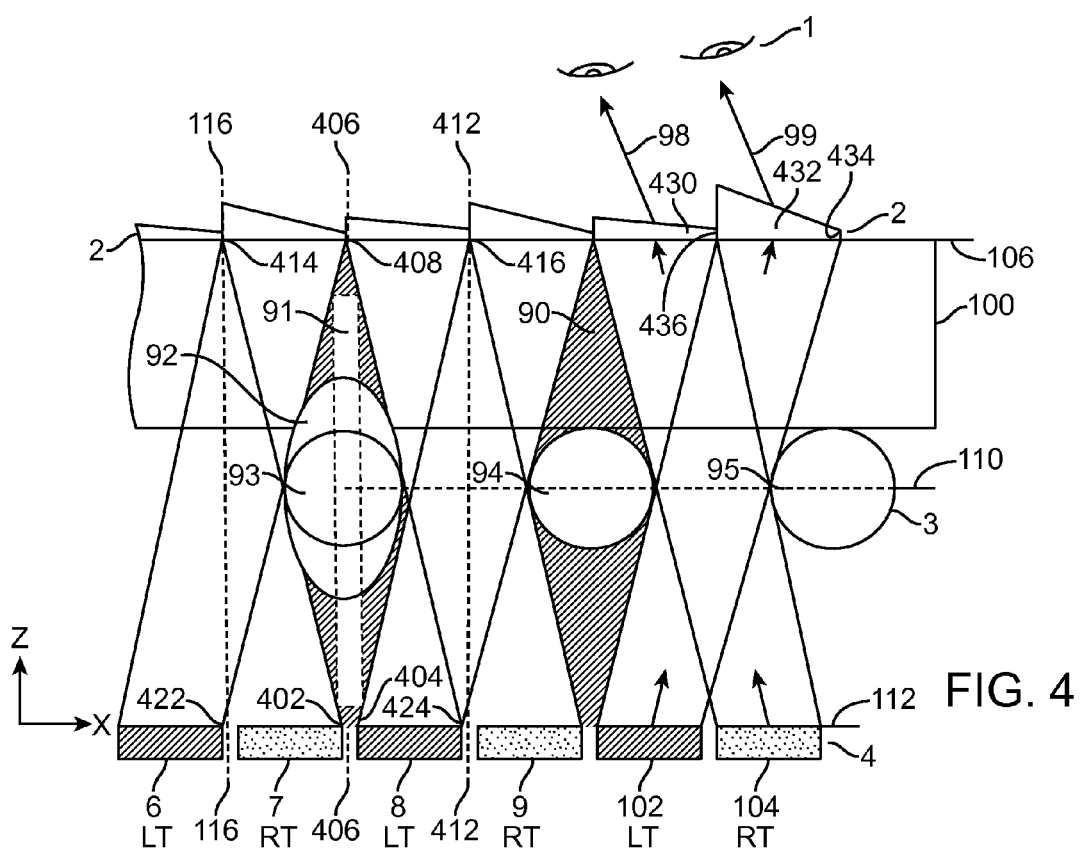
FIG. 4 shows a section view of an example embodiment of the invention.

FIG. 4 shows several example embodiments of the aperture array in a section view through the z-x plane. The aperture array may be formed from a series of cylinders with a circular cross section 93, or alternatively an oval or elliptical shape 92, or a rectangular solid 91. An important aspect of the invention is the identification of the full theoretical extent of the aperture boundary, shown as the area enclosing the shaded region 90 of the adjacent aperture wall. A diamond shaped cross section of the aperture boundary represents an optimized aperture structure, for maximum isolation of right and left optical source pairs. In several example embodiments, an aperture structure which provides a shape which includes the central region (such as circle 93), or extends to include further regions in the z axis (such as oval or ellipse 92, or rectangle 91) is sufficient for satisfactory generation of full depth images using the geometry shown. The optimal aperture structure outline may be constructed as follows:

Given a midline 406 which separates a first LT/RT source pair 418 such as 6,7 from a second adjacent LT/RT source pair 420 such as 8,9, find the intersection 414 of the midline 116 of the first LT/RT source pair with the third (lens) surface 108. Construct a first line from the rightmost emitting extent 402 of the first LT/RT source pair at source surface 112 to the midpoint 116 at the third (lens) surface 108 and also a second line from the leftmost emitting extent 404 of the second LT/RT source pair at source surface 112 to the midpoint 412 of the second LT/RT source pair. Construct a third line from the intersection 408 of the third (lens) surface 108 and the midline 406 to the rightmost emitting extent 422 of the left emitter of the first source pair 418. Construct a fourth line from the intersection 408 of the third (lens) surface 108 and the midline 406 to the rightmost emitting extent 424 of the left emitter 8 of the second source pair 420. The boundary of the aperture wall lies between the first emitter surface 112 and third (lens) surface 108, enclosed by the first line, second line, third line, and fourth line thereof. In certain example embodiments of the invention, the third (lens) surface 108 is a reference surface for construction of the aperture wall only, and lens 2 is not present or needed. In certain other example embodiments of the invention as shown in FIG. 4, lens 2 is present as shown, and the central region includes lens elements such as 20,21 of FIG. 1 which are symmetric about the midline 116 of an emitting pair 6,7, whereas the outer extents (on either side of the x axis), have the lens structure 2 formed with non-symmetric lenses 430 and 432, with the interior angles 436 and 434, respectively, chosen to direct optical energy 98 and 99, respectively, to a viewer according to the geometry of the viewer to the screen and incoming optical energy from emitters 104 and 102, respectively. As shown in FIG. 4, the apertures of the aperture array may be formed using several geometric shapes. Diamond-shaped aperture wall 90 provides side-wall barrier isolation between apertures, which will block optical leakage from adjacent LEDS. In one example of the invention, the aperture wall is a non-reflective, or darkened material for minimal scattering or reflection of incident optical energy from adjacent emitters. For ease of fabrication, a bar cross section such as 91, oval cross section such as 92 or a cylindrical section like 93 may be easier to fabricate. Although cylinders are shown in the subsequent figures, it is understood that the invention may be practiced with any of the three dimensional aperture walls 3 in single or variant patterns as described, and separately with or without a lens structure such as 2.

FIG. 4 also shows an example embodiment for the aperture wall 93, 94 and 95 attached to a flat substrate 100 to maintain alignment. The aperture walls can be printed on the substrate with a 3D printer to give shapes such as the round or elliptical sections shown, or half-round or flat, and fabricated such as by deposition of opaque material onto transparent substrate 100. The opposite surface of substrate 100 may be used for the fabrication or attachment of lens structure 2 in its various embodiments.

One problem that may arise is the off-axis projection of the image and associated fall-off in intensity as the image is directed away from the viewer (in the x direction only) at the edges of a physically large display. In an example embodiment, FIG. 4 shows a lens profile that may be used at the extreme edge of a 55 inch screen, 2 feet from the centerline, such that an observer at a distance of 5 feet will view the edge of the screen 100 at an angle of 22°. To re-direct the image more directly towards the viewer, the two wedge angles then become 5° for interior angle 436 for the inner ("red") beam 98 going to the right eye and 23° for interior angle 434 for the outer ("blue") beam 99 going to the left eye, with the narrow ends of the wedges directed outwards. In this way, the wedge lenses of the design can be individually tailored for each viewing angle from the center outwards. Accordingly, the lenses 20 and 21 of FIG. 1 may be symmetric about the pixel pair 6,7 at the center (as shown in FIG. 1, with the associated interior lens angles progressively increasing to the outer edge of the display).

In a further example with the viewer separated from the screen (lens surface 108) by 10 feet, one or more viewers of the full-depth image will be able to view the edges of the screen at angles of up to 11°. Nevertheless, it is beneficial to provide a lens bias into the outlying wedge lenses to steer the main body of light towards the viewers.

It may be noted in these computations that an observer may be fairly comfortable viewing from a number of positions, since the images will track over a substantial range. It should be understood that the above computations for optimal viewing at a particular distance are for understanding of the invention, rather than a limitation of structure. The applicants have observed that the system also works satisfactorily with no lens element 2 present at all.

Figure 5:
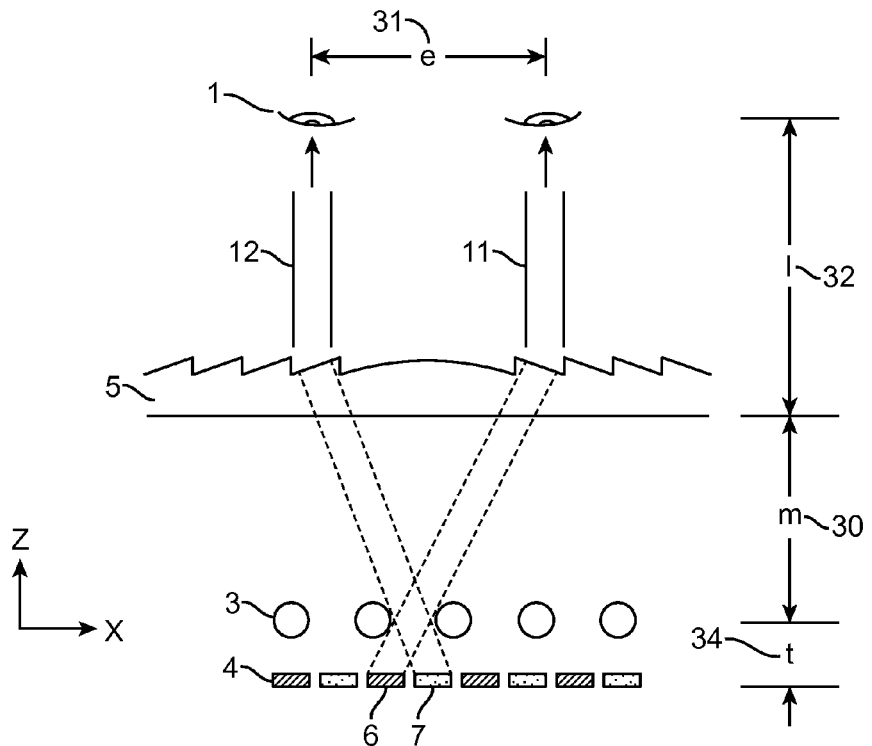
FIG. 5 shows a geometrical section view of left and right beams diverging through a system of apertures towards a condensing lens.

FIG. 5 shows a condensing lens embodiment with a circular Fresnel lens 5 which has the profile shown in the x-z plane throughout the extent of the y axis, which has the benefit of causing the emitted light to flow in virtually parallel or slightly divergent paths with respect to the z axis at the center of the screen, resulting in an increased range of usable separation distances from viewers to the screen surface 108, providing the experience of full-depth viewing over this range in comfort. Outside of a central viewing region, Fresnel lens 5 has segmented lens elements which have pitch which can be equal to the pitch p of the individual optical emitters for optimum range of viewing. In another example embodiment of the invention, condensing lens 5 can be combined with shaping lens 4 to optimize the viewing optics. Lens 5 can also magnify the scene by some factor such as two or five times, which in itself enhances the full-depth effect. In FIG. 5 the particular distance which causes this is where the condition m/t=e/p is satisfied, where:

m (30) is the distance from the condensing lens 5 to the apertures 3.

e, t, and p are as previously defined in FIG. 1.

The distance 1 (32) from an observer to the condensing lens for comfortable full-depth viewing is typically from 5 feet to 20 feet.

Returning to the aperture array 3 of FIG. 1, it can be seen that the use of wires 41, 42, and 38 for the aperture walls in the creation of apertures there are penumbras (areas of partial occlusion) 13 and 14 associated with the optical paths from each LED to the lens plane 108 as the optical energy passes between the wires 41, 42, and 38 of the aperture array 3. Following the optical paths backwards emitted light rays 11 and 12 refract from their particular prism sections 21 and 20 of the Fresnel lens squarely, but the divergent light beams of optical paths 15 and 16 are incident upon the wedge lenses 22 and 19 in a manner which causes the undesired refraction away from the observer. This illustrates the importance of the positioning symmetry of the Fresnel lens 2 on the opposing side of the apertures 3 from the LED array 4, where they can be the most effective in steering the light and more efficiently collecting image energy from the optical emitters and directing it towards the viewer at the observer plane 114.

The use of cylindrical aperture array 3 in forming the apertures 37 and 118, coupled with the distance s 33 from the Fresnel lens 2 to the aperture plane 110 creates an ability to almost fully block or reject the side bands from adjacent LEDs. In the case of optical emitter 8, a main beam of light emerges through aperture 37 between the wires 42 and 38 of aperture array 3 to strike associated wedge lens with a main beam angle which is parallel to ray 11' from optical emitter 6, thereby striking lens surface 108 to generate a slightly diverging optical beam. However, the optical beams from emitter 8 which are to the side of central rays 11' and 12' will be refracted through a large angle (shown as arrow 17) to be emitted out of viewing range. There is also a penumbra associated with LED 8 which emerges from wedge 20 at an angle similar to that of LED 7. The off-center optical energy can be minimized either by increasing the wire diameter one or two hundredths of an inch or by reducing t and s, or both. In this configuration it is the only instance of overlap by adjacent bands. In the case of light emitted from adjacent LED 9 it can be shown that the cylindrical sections 41 and 42 occlude the emerging light almost totally, leaving only small residual penumbras. The light from the surrounding LEDs in the optical array is totally occluded from the described aperture and lens.

It can therefore be seen that increasing the separation of the Fresnel lens 2 from the apertures 3 and the LEDs 4 may be necessary for mechanical or other reasons. However the reduction of these dimensions will greatly reduce the optical side-band emissions.

Cylindrical sections for the aperture array have been presented in the examples because they are simpler conceptually but it is understood that other cross section shapes including oval or elongated structures from FIG. 4 could also be used.

With regard to FIG. 1, the inventors have also experimentally verified that a 2D aperture array in the form of an aperture which is thin in the z axis direction generates undesired image artifacts. The main beam of light from LEDs 6 and 7 will emerge normally, but the off-center radiated energy will have very little to block it. Light from will all LEDs will escape far to the sides at increasingly grazing incidences.

One of the aspects of selection and design of the aperture walls to consider is the effects of diffraction. When light from the LEDs hits a cylindrical section, the ability to diffract is spread over the surface, so there will be less diffractive optical interference than from the optical energy crossing a boundary with sharp edges. Also, at an average wavelength of visible light of 550 nm (or 0.55 u) and an aperture width of 0.025" (or 635 u), the diffraction effects at this ratio (over 1000 to 1) are negligible. Even with a 4K pixel screen and aperture widths of 0.012 inch, similar results (i.e. over 550:1) are obtained to generate very small diffraction effects.

To minimize diffraction effects at the boundary of the aperture, FIGS. 11A, 11B, 11C, and 11D shows a method to minimize diffraction and to eliminate aliasing in flat sections of the aperture. Diffraction effects generate a series of minute rings or fringes, which distract from the image viewing. FIG. 11B shows an aperture wall with sharp edges around each aperture 75, which generates the sharp edged intensity pattern 70 shown in FIG. 11A. With increased distance, in the optical far field, undesired fringing of the optical energy at intensity edges 1102 may be observed. In the near field of FIG. 11A, the light intensities 70 are essentially square waves with sharp transitions. One approach for minimizing the fringing diffraction effects is known as apodization of the aperture by application of partial transmission according to an x-dependent transmissivity function at the edge of the aperture. In the example shown in FIG. 11D, the apertures 77 and 78 are printed using a pattern or transparency which results in a softer transition from opaque to transparent in the transition region of the aperture. As is known from Fourier optics, the far field transmission pattern may be formed as a sinc function (sin(x)/x) or other transition to minimize the formation of the diffraction fringes. In one example embodiment for the transmissivity of the aperture array, a variable transmission film is printed over the first period 1104 covering an extent of ⅔p, followed by a transparent aperture in region 1106, followed by a second period 1108 covering an extent of ⅔p, surrounded by opaque regions 1110 and 1112. The transmissivity of the apertures in regions 1104 and 1198 may utilize a transition such as a sinc function $$\frac{\sin(x)}{x}$$

where x is in the spatial domain, appearing as plots 71 and 73 in the transition regions, segment 72 in the transparent region of the aperture, and segment 74 in the opaque region of the aperture. Various other anti-aliasing aperture edges may be formed to avoid diffraction fringes, including a linear taper of transmissivity, a Gaussian function transmissivity taper, or other modulation of transmissivity at the aperture edge.

Taken together, the four regions of transmissivity 71, 72, 73 and 74 cover a complete cycle of 2p for every aperture of array 4, resulting in minimum far-field diffraction fringing experienced by the viewer of the full-depth images.

One of the primary advantages of the applicant's invention is the ease of generation of 3D images, which is fully compatible with the output of existing 3D displays. A typical prior art 3D display, such as a projector in a movie theater may utilize a color image separated into a left and right polarized image component. The viewer dons polarized glasses having 90 degree separation of polarization which match the polarization of the images projected onto the viewing screen. In the prior art method, the two sources of video (right and left) are provided to the two projectors and projected onto a common screen for viewing. In applicant's system, those same two video sources are provided to the optical emitters ("LT" suffixed RGB emitters and "RT" suffixed RGB emitters), and directly viewed as a full-depth 3D image. Accordingly, an important advantage of applicant's system is the immediate compatibility with existing 3D video content. If it is desired to switch to 2D from 3D or back again this can be done by re-assigning pixels and driving them with a common video source. In one example embodiment, only the RT or LT video sources are driven to generate a flat 2D image, and in another example embodiment, the RT and LT optical emitters are connected to a common video source. In either case, a High Definition (HD) source such as 4K or UHD format will generate an image which remains HD.

FIG. 12 shows a variant of the aperture array in the x-y plane, where the aperture array is rotated, such as by 45 degrees, so that the apertures are not oriented parallel to the y axis, but have a rotation angle with respect to the y axis. By assigning the "left" and "right" pixels to run diagonally up the screen at an angle which matches the rotation angle, such as 45°, and adjusting the pixel pitch in the x axis to match the effective aperture pitch in the x axis direction, then all left view optical emitters 6 are interleaved with all right view optical emitters 7, with the apertures 76 straddling the LEDs by their diagonal corners 81 and 82. With this rotation of the aperture array and matching arrangement of RT and LT optical emitters, now full-depth viewing can be achieved both in landscape orientation 83 of the monitor (as shown) and also in portrait orientation 84, by rotating the screen counterclockwise through 90° (80). The mapping shown in FIG. 12 is particularly valuable where the aperture array is rotated by substantially 45 degrees as shown, because with the arrangement of LT and RT pixels of FIG. 12, after rotation of the display, the "right" pixels 7 remain on the right and the "left" pixels 6 remain on the left before and after rotation by 90 degrees. The full depth image effect remains unchanged after rotation of the display, which is not possible with other prior art full depth imaging systems.

Other rotations of the aperture array are possible, requiring only the pixel pitch p match the horizontal pitch of the aperture array. Example aperture array rotations with respect to the y axis in the x-y plane include 45 degrees, as well as 26.5 degrees and 18.5 degrees. References to substantially 45 degrees, substantially 26.5 degrees, or substantially 18.5 degrees are understood to be within +/−5 degrees of nominal value. It is believed that these angles provide additional robustness against small angular errors in the aperture array rotation with respect to the y axis.

In FIG. 12 if the separation of the pixels 85 is denoted as p then the separation of the apertures 86 along the x axis will still be p but at 45 degrees it will be $$\frac{p}{\sqrt{2}}$$

because with square pixels the apertures will be running at 45° with respect to the y axis.

The pixel image format for FIG. 12 with its apertures running at 45° to vertical is

LRLR
RLRL
LRLR with the optical source pixels (LEDs) 6, 8 etc. creating the left-eye images and the pixels (LEDs) 7, 9 etc. creating the right-eye images.

If one turns the screen "upside-down" through a 180 degree rotation, the same will be true if all pixel assignments are flipped between 6, 8 (left) and 7, 9 (right), which can be triggered instantly by a sensor coupled to the mechanical rotation of the screen. Detection of a screen inversion from a 180 degree rotation simply reverses the pixel image format as described above. Accordingly, one of the advantages of the invention is the provision of viewing in full depth over every rotational orientation.

The ability to maintain full depth viewing over arbitrary angles of rotation is particularly useful for full-depth viewing of images in smaller devices such as tablets and cell phones, since the apertures would be at an very small distance, on the order of 0.010 inches away from the LEDs. If needed, a lens surface, such as a Fresnel lens, would be separated from the aperture array by 0.010 inches. The invention of the present system of aperture array, arrays of LT and RT optical source, and optionally lenses, could be embedded directly into the display by a device manufacturer.

For devices with smaller viewing angles such as tablets and cell phones, the Fresnel lenses are not strictly necessary, although an embedded Fresnel lens magnifying up to 5× may be desirable to enhance the full-depth effect, or for improving the view for those with poor vision.

Figure 13:
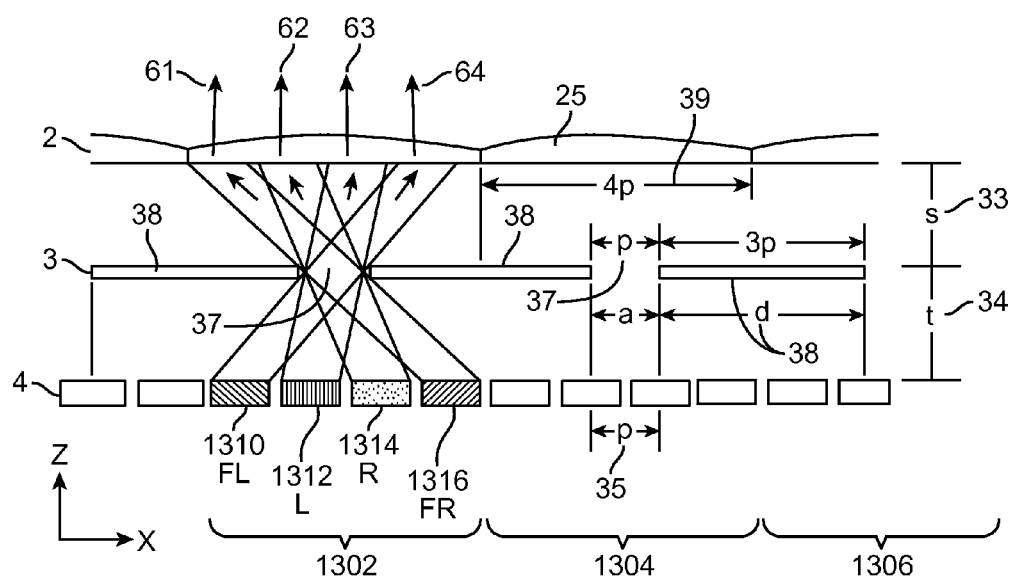
FIG. 13 shows a cross section view in the x-z plane for an example of the invention for the generation of four or more images.

FIG. 13 shows another example embodiment of the invention, where the number of possible viewpoints can be any number of viewpoints greater than two, and shown as four for clarity in description. This enables the showing of images in richer depth from three, four or more coordinated cameras. The effect will be additionally enhanced as the available intensity of LEDs is steadily improved.

FIG. 13 shows a set of four separate images which are assigned to columns represented by tristimulus LEDs (or pixels) 1310, 1312, 1314 and 1316. The four separate images would be separated into "Far Left" (FL), "Left" (L), "Right" (R), and "Far Right" (FR). In a first embodiment of the invention, a tristimulus pixel 1302 would comprise a red emitter, green emitter, and blue emitter, each of which has a FL 1310, L 1312, R 1314, and FR 1316 emitter. In a second embodiment of the invention, each of the optical emitters 1310, 1312, 1314, 1316, is a single-color emitter, such as a red FL emitter 1310, a red L emitter 1312, a red R emitter 1314, and a red FR emitter 1316 forming a single-color pixel 1302, followed by blue emitters 1304 and green emitters 1306, each providing one of the colors used to form the complete image. For the first embodiment of the invention, the tristimulus emitters are 1310, 1312, 1314, and 1316. The pixel image format for this is

FL-L-R-FR
FL-L-R-FR
FL-L-R-FR
FL-L-R-FR with the pixel columns 1310 (FL) and 1312 (L) creating images observable by the viewer's left eye, and the pixels (LEDs) 1314 (R) and 1316 (FR) creating images viewable by the viewer's right eye, with respect to aperture 37. For this geometry, aperture 37 has a width approximately equal to p to properly separate the emitted light into beams 61, 62, 63 and 64. The width of the bars 38 which form the aperture array wall is 3p, so that a+d=4p satisfying the required constraint that when a is optimized to be wider or narrower, the sum a+d must always adds up to the period p of four pixels.

It can now be seen that if the apertures are made to run at an angle such as 45° to the screen with respect to the y axis in the x-y plane, such as vertical up to the left (as in 2 of FIG. 1) then the four-view pixel image format becomes

FL-L-R-FR
FR-FL-L-R
R-FR-FL-L
L-R-FR-FL with the pixels assigned as in FIG. 13, but now in the appropriate diagonal manner as was shown in FIG. 12.

Although FIG. 12 shows the apertures and LED assignments rotated counterclockwise 45 degrees in the x-y plane, and preserving the full-depth display characteristics for additional clockwise rotation of an additional 90 degrees, the arrangement of pixels and apertures is arbitrary. In another example embodiment (not shown) the aperture array could be rotated to form elongate aperture slots which are rotated 45 degrees clockwise from the y axis, which would mean rotating the screen clockwise through the left lower quadrant to see full depth continuously. For all diagonal arrangements full depth should be visible almost semi-circularly about this quadrant without inverting the LED assignments.

From FIG. 13 the light directed through the apertures is refracted by a cylindrical lens 25 of width 4p (or 0.28p in the case of diagonal) to emerge slightly divergent or parallel. For symmetry the distances s from lenses 2 to apertures 3 and distance t from apertures 3 to LEDs 4 are equal. Beyond lenses 2 the beams 61, 62, 63 and 64 can later be refracted parallel by a condensing lens (such as lens 5 in FIG. 5) so that perfect images can be created at any distance.

The same general rules apply for three, five or more viewpoints. The aperture width always remains p. For example the pixel image format for three viewpoints running vertically is

LMR
LMR
LMR with L being the left, M being the middle, and R being the right pixel. As was described for FIG. 1, each of n emitters which are associated with a particular aperture 37 and generating a field of view may be single-color, multi-color, tri-stimulus, or multi-stimulus emitters, such that each emitter may generate at least one of red, blue, green, or white optical energy.

All assignments and re-assignments of pixels 6, 7, 8 and 9 for any particular purpose are done by arranging that the particular pixels are addressed according to the geometry of the aperture array. Generally the access time for writing to the screen (i.e. sending data) or re-assigning the pixels is in milliseconds, typically 20 ms for local data at 1920p, slightly longer for remotely streaming data, depending on the packet sizes and the vagaries of the Internet.

In one example aperture array, the cylindrical aperture walls are formed with black anodized aluminum wire having a 0.025" diameter placed over a frame, with the wires oriented parallel to the y axis (vertically) on a 0.050" period. The wires provide a very clean section. Clear nylon filament has also been experimentally verified with good results. However wires, filaments, twine, thread, etc. suspended like this cannot easily maintain uniform separations and registration over the optical emitters. The inventors believe that a substrate providing uniform support over the extents of the display is helpful for maintaining the required relationships between optical emitters and aperture array. One method is to affix the wires directly against, or to embed them in, a flat plate substrate. In one example experimental system, a C02 laser was used to cut slots directly into transparent acrylic plates. Another method is to use a 3D printer to print opaque structure onto the acrylic plate. Another method for planar printing of thin structures is to provide "dithering" either with structures such as stippled transition edges, or variable transparency films, to avoid the diffractive fringing previously described in FIGS. 11C and 11D.

A method to simulate affixing cylindrical sections to a flat plate is to use a 3D printer to extrude or otherwise print a 0.025" filament (black, frosted or clear) which will stick on a clear glass or acrylic sheet forming the substrate. To keep the filament consistent in over 960 passes, the bead must be monitored and controlled in process optically. Naturally, perfect accuracy is preferred, but it has been discovered that with a diameter of 0.025 inches, a tolerance such as ±0.002" in size and position is possible and acceptable.

Figure 6:
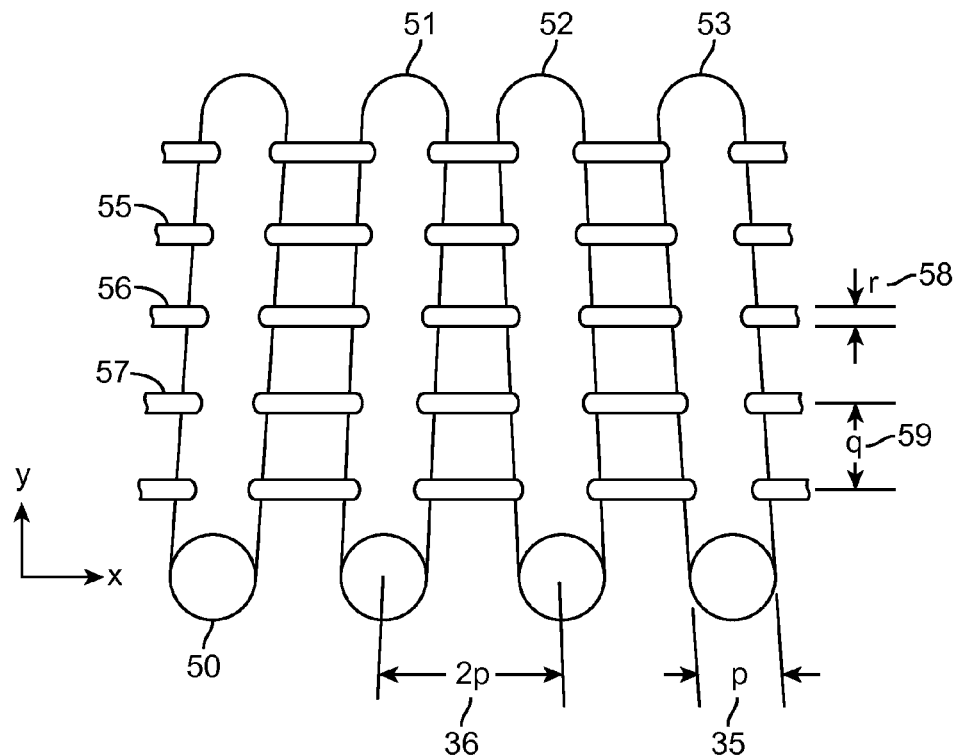
FIG. 6 is an isometric view of an example aperture array in the x-y plane.

Another method of creating a wire mesh 50 is shown in FIG. 6. Here the wires (52) can be printed in 3D on 2p (36) centers with defined diameters p (35) of 0.025". For support in the x direction, cross-braces (56) of 0.005" diameter r (58) can be added with a cross-brace spacing q (59) which will not be visible or introduce artifacts in use, but rigid enough to keep the wires 50, 51, 52 and 53 parallel. If printed on a substrate the wire mesh can be lifted off intact using a release agent, or if the substrate is appropriate simply left in place.

In one example embodiment of the invention, the aperture array is formed from cylindrical wires as shown in example FIGS. 1, 2, and 3 for the implementation of apertures in the gaps between the wires of the aperture array. Minor flattening of the cylindrical aperture array when deposited on a glass, plastic or other transparent substrate may occur, but prototype constructions of the invention have shown these to be of only minor detriment of the full-depth image effect. As indicated previously, other aperture wall sections may be fabricated, including half-cylinder, oval, polygons and flat in various orientations and dimensions.

With regard to the surface finish of the aperture walls, it is preferable for the surface to include an anti-diffraction treatment such as an irregular edge at a transparent/opaque interface, including dendrites from fabric such as black thread. Although a black non-reflective aperture wall is preferred, experimentally it has been determined that little apparent difference to the image quality occurs when the aperture wall material is frosted or clear, or whether the surface is grey or black. Frosted or clear aperture walls are more desirable because they are less conspicuous from various viewing angles.

Figure 8:
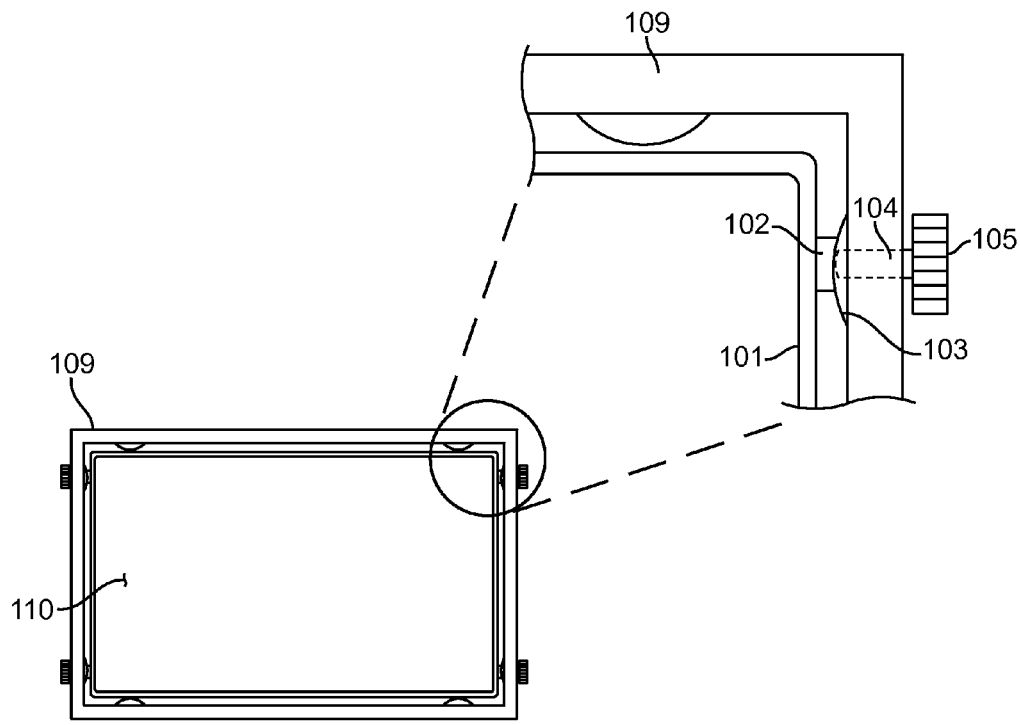
FIG. 8 shows an example mechanical fixture for attachment of screen modifier to a display.

In certain circumstances, the optical emitter arrays may be part of one assembly, such as an existing display, and the aperture array and optional lenses may part of a removable structure which is attached to the existing display. For this application, it is important to achieve precise mechanical alignment between the existing display and the removable aperture assembly. Various embodiments of attachment and alignment are shown in FIG. 8, FIG. 9, FIG. 10A, and FIG. 10B. The screen modifier 100 which is placed over the display includes an adjustable frame or a frame combination for mounting to an existing TV or monitor. FIG. 8 shows one example fixture for precisely aligning the screen modifier 100 with the TV screen 110 using thumbscrews 105 for alignment in the x axis.

Figure 10A:
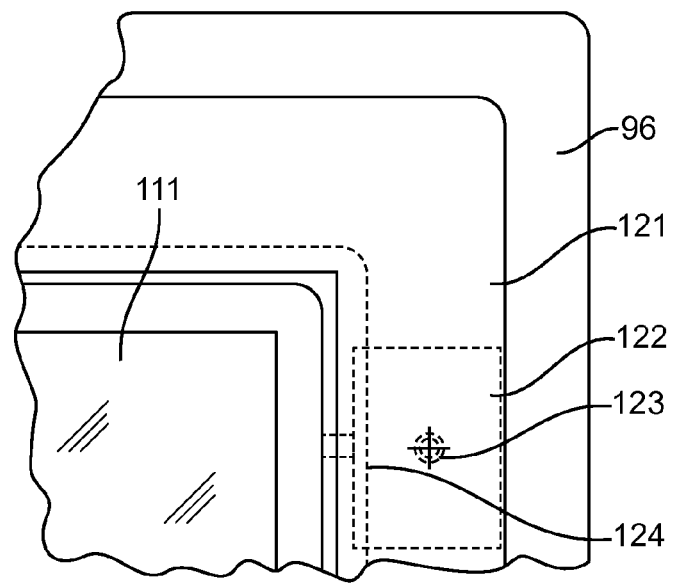
FIGS. 10A and 10B show an alternative mechanism for mounting the screen modifier onto an existing monitor having a glass or plastic bezel using hook and loop fasteners.

FIG. 10A shows a support frame 121 and FIG. 8 shows a sub-frame 109, each of which provide attachment and alignment surfaces for aligning the support frame 121 or sub-frame 109, which may include the aperture array. The removable assemblies are designed so that they do not mar the TVs which they are enabling, either in attachment or in detachment.

Figure 7:
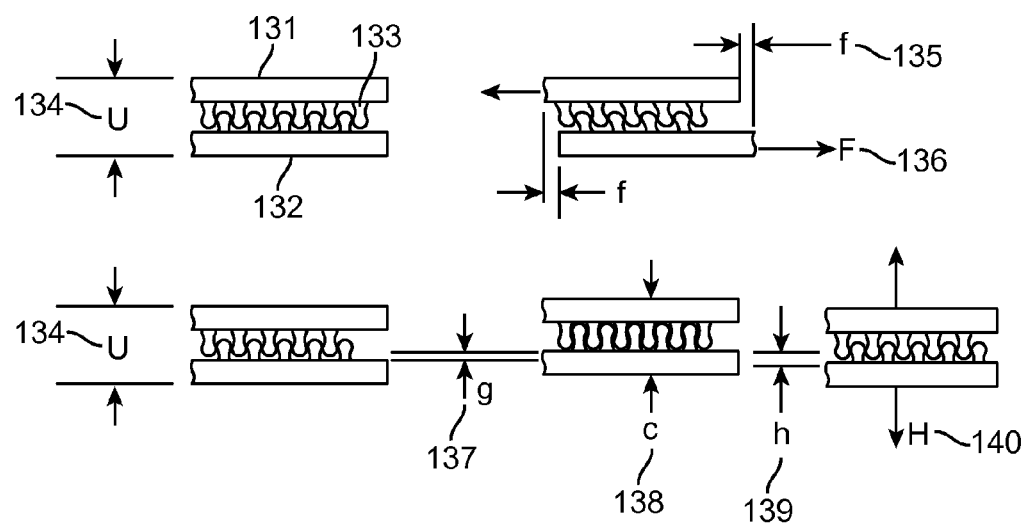
FIG. 7 shows a section view of hook and loop fasteners for attaching and aligning an aperture array to an array of emitters.

A simple means of attachment which allows for adjustment is shown in FIG. 7. Hook and loop fabric (such as Velcro®) can provide a holding frame to be fastened easily onto the outside of any type of TV with a bezel. The holding force must be enough to hold the frame's weight during adjustment, which is until it is locked.

Figure 10B:
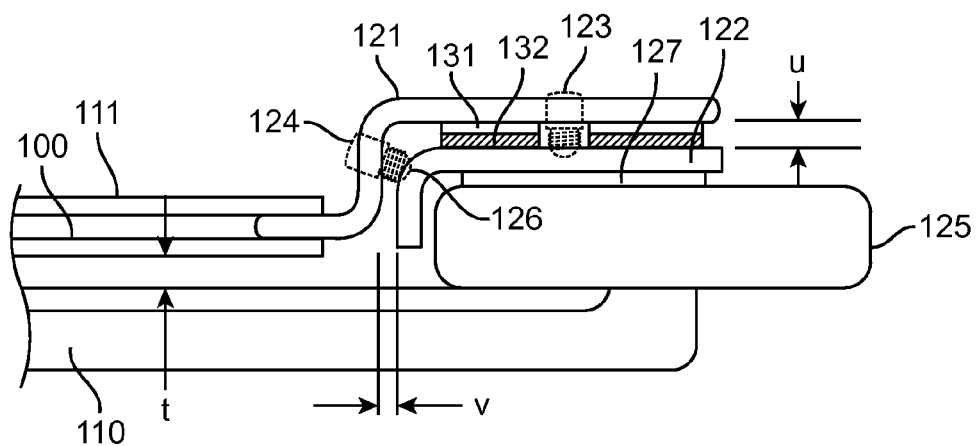

In FIG. 10B, the hook and loop fabric is shown attaching the frame edge 121 to the pad 122. By adjusting the screw 123 upwards, a force 140 is applied to stretch the hook and loop fabric, increasing the gap v between the frame 121 and the pad 122 by an amount h. This will bring the screen modifier 100 further away from the display screen 110 by the same amount h. Similarly for the lateral adjustment the hook and loop fabric can be stretched left or right with a displacement f by adjusting lateral screws 124. The screws 124 can also be used differentially to rotate the apertures 3 in the screen modifier 100 to bring them into alignment with LEDs 4 on the TV screen 110. Screws 124 can also help to firmly lock the holding frame 121 laterally against pad 122 once adjustments are made.

For the various screen attachment devices shown in FIGS. 8, 9, 10A, and 10B, the range of adjustment required to bring apertures and LEDs into alignment is very small. For a large (55 inch) screen in the order of 0.020 inches, well within the stretching capacity of the particular Velcro used.

Figures 9, 9A:
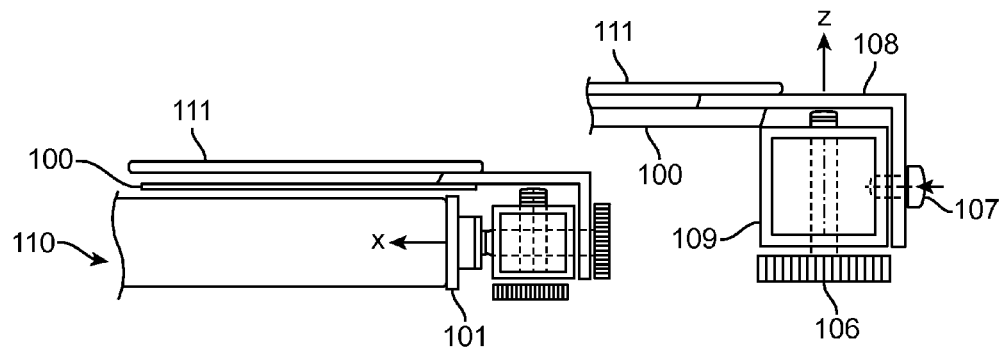
FIGS. 9 and 9A show a projection view through an alignment and adjustment mechanism for attachment of an aperture array to an array of optical sources.

FIGS. 8 and 9 show a different approach for a sub-frame 109, for attachment to a TV or monitor with a metal edge and no bezel.

The earlier described coordinates x, y and z are indicated for the different axes required for aligning the screen modifier apertures 3 with lenses 2 and the monitor LEDs 4. The monitor axes are x (seen normally as horizontal), y seen normally as vertical, and z away from the TV towards the viewer.

For precision alignment, two frames are required: a sub-frame 109 for the X and y axes adjustments and a top frame 108 for the z-axis adjustment. Sub-frame 109 can be fabricated from aluminum box tubing and top frame 108 fabricated from aluminum angles for the combination to be adjustable on three axes, plus light, stiff and strong. These frames together are "light-weight structural elements".

FIG. 8 shows the sub-frame 109 attached to a typical monitor (or television) 110 with pads or magnets 102. For an example monitor with a circumferential ferrous edge 101 approximately 1 mm thick, no alteration or attachments to the unit are necessary. The magnets 102 (in the four positions shown in FIG. 8) are attached to sub-frame 109 with leaf-springs 103 in such a manner that a thumb-screw 104 with a fine pitch thread (such as a 10-40) can adjust the spring up to 0.012" to "nudge" (for exceedingly small motions) the sub-frame so that the apertures 3 on modifier 100 are brought into precise horizontal alignment with the LEDs 4 on the monitor. The strength of the magnets is 4 to 5 lbs each giving a temporary aggregate holding force of 16 to 20 lbs, enough to hold the sub-frame well enough, but not so tightly that it cannot be adjusted and if necessary, detached and replaced.

The thumb screws 105 (which can be set-screws) of FIG. 8 are set in four places 110 on the vertical edges and with a small differential adjustment (e.g. ±0.005") can also do the vertical (or skew) alignment of the wires on sheet 100 with the LEDs 4 to bring them into precise vertical registration. Within one or two iterations (after some adjustments with top frame 108) the four thumb screws 105 can lock the sub-frame 109 into place. It should be noted that springs 103 only, without thumb screws, are required top and bottom since generally no up or down alignment is required.

Top frame 108, which holds the aperture sheet 100 and the protective glass cover 111, is designed to snap over the sub frame 109 in such a manner that it is adjustable on the z-axis. This adjustment is achieved with thumb screw 106 which can raise or lower top frame 108.

When this is adjusted perfectly, the frame can be locked with side screw 107.

To remove and replace holding frame 108, the four screws 107 are loosened or removed, or if it is desired to return the monitor 110 to its original condition, sub-frame 109 is removed by loosening the thumb screws 105 and sliding off the pads or magnets.

Figure 14:
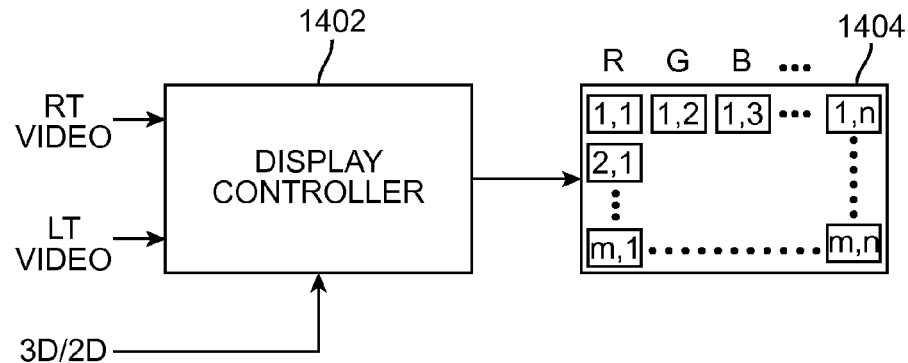
FIG. 14 is a block diagram for a display controller for 2D and 3D image presentation.

FIG. 14 shows a display controller 1402 which accepts a LT (left) video source and a RT (right) video source, as well as a 3D (full-depth) vs 2D (conventional) mode input which selects 3D or 2D display mode as mapped to display 1404, which has n columns of individual optical emitters and m rows of individual optical emitters, addressed in standard matrix form (row, column) for the indexes shown. 2D imaging may utilize the RT video input with the LT video input ignored to save on the number of different input connectors required, or alternatively, the 2D video input can be provided as a separate input. The video format can be any known in the prior art, including High Definition Multimedia Interface (HDMI), Digital Visual Interface (DVI), or any other video format which may be utilized. As described previously, each pixel can be a monochrome emitter, or more commonly an RGB emitter. In a color display, the same-color pixels may be commonly arranged adjacent to each other as RRGGBB described previously, such that a row of 3D pixels might be $[R_{RT}, R_{LT}, G_{RT}, G_{LT}, B_{RT}, B_{LT}]$, or alternatively, the row could be arranged as RGBRGB $[R_{RT}, G_{LT}, B_{RT}, R_{LT}, G_{RT}, B_{LT}]$, which is the example mapping of individual optical emitters of FIGS. 15A and 15B which will be described.

Figure 15A:
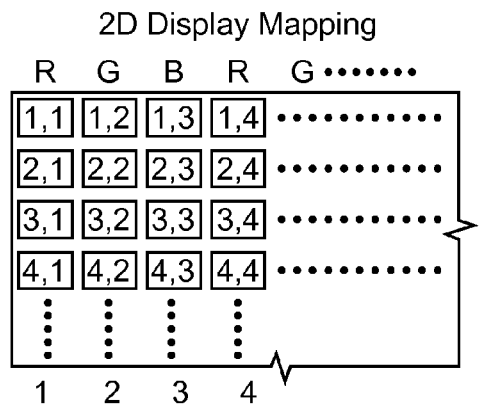
FIGS. 15A and 15B show display mappings for 2D and 3D video as provided by the controller of FIG. 14.

FIG. 15A shows the 2D conventional mapping of an image as RGBRGB, where a single source of 2D video (such as the RT video input) where each sequential image pixel element is sequentially mapped into columns in the conventional way, as shown in FIG. 15A, with each emitting element representing a subsequent picture element, and with each "R", "G", and "B" component of each pixel coupled to an associated optical emitter, as is known in the prior art.

Figure 15B:
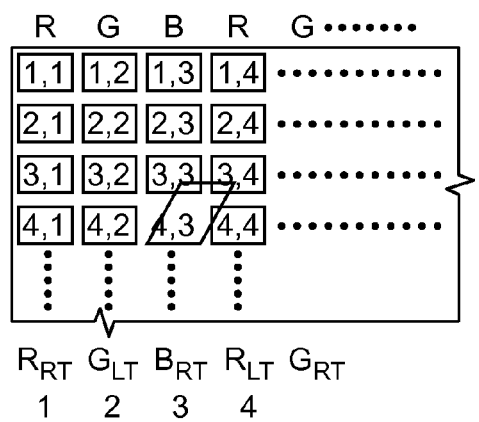

FIG. 15B shows a 3D mapping of the same RGBRGB display, with the left video source coupled to the "LT" subscript elements, and the right video source delivered to the "RT" subscript elements, such that the RT video input and LT video input is rearranged such that a single 3D pixel comprising $[R_{RT}, G_{LT}, B_{RT}, R_{LT}, G_{RT}, B_{LT}]$ is mapped and applied to the associated RT and LT columns as shown.

While the invention has been described and illustrated as one in which arrays of apertures may be combined with or without a lens structure to separate left and right perspective views in order to create full-depth vision, to those skilled in the art it will be clear that other derivations of this technology are possible. These derivations include (but are not limited to): other separations of the elements 1, 2, 3, 4 and 5; differing angles across screen 4 for apertures 3; differing periods for 2 and 3; differing configurations and materials of the elements of aperture array 3; differing focal lengths and distances to single or multiple observers; differing manners, means and materials for attaching, adjusting, detaching and replacing screens containing elements 2, 3 and 5.

It may be understood that although specific terms are employed, they are used in a generic and descriptive sense and must not be construed as limiting. The scope of the invention is set out in the appended claims.

We claim:

1. A full-depth display comprising:
   an array of optical emitting elements arranged on a first surface, said optical emitters arranged in pairs comprising a right emitter and an adjacent left emitter;
   an aperture array positioned on a second surface which is substantially parallel to said first surface, the aperture array including a plurality of apertures operative to guide optical energy from said optical emitters such that optical energy from each left emitter is directed to a left eye of an observer and optical energy from each right emitter is directed to a right eye of an observer;
   said aperture array having substantially opaque elements positioned in a midline between said pairs of optical emitters;
   said substantially opaque elements contained within a diamond shaped boundary having a first vertex and a non-adjacent vertex both positioned on said midline.

2. The full-depth display of claim 1 where said optical emitting elements are at least one of a light emitting diode (LED), a plasma discharge element, or a liquid crystal having an illumination source.

3. The full-depth display of claim 1 where said optical emitters are arranged in a repeating sequence of left emitter and right emitter.

4. The full-depth display of claim 1 where said optical emitters include emitters of red optical energy, emitters of green optical energy, and emitters of blue optical energy.

5. The full-depth display of claim 1 where said aperture array includes a lens structure refracting optical energy from said aperture array to a central region.

6. The full-depth display of claim 5 where said lens structure is a series of wedge lenses.

7. The full-depth display of claim 5 where said lens is a Fresnel lens.

8. The full-depth display of claim 5 where said lens is a Fresnel lens with at least one set of lens steppings which are at the same pitch as an optical emitter pitch.

9. The full-depth display of claim 1 where said first surface and said second surface are planar.

10. The full-depth display of claim 1 where said right emitter and said adjacent left emitter are tristimulus emitters.

11. The full-depth display of claim 1 where at least one of said right emitter or said left emitter of an emitter emits at least one of: red optical energy, green optical energy, blue optical energy, or white optical energy.

12. The full-depth display of claim 1 where said aperture array is rotated with respect to a y axis.

13. The full-depth display of claim 12 where said aperture array is rotated substantially 45 degrees, 26.5 degrees, or 18.5 degrees.

14. A full-depth display comprising:
   an array of optical emitting elements arranged on a first surface, said optical emitters arranged in pairs comprising a right emitter and an adjacent left emitter;
   an aperture array positioned on a second surface which is substantially parallel to said first surface, the aperture array including a plurality of apertures operative to guide optical energy from said optical emitters such that optical energy from each left emitter is directed to a left eye of an observer and optical energy from each right emitter is directed to a right eye of an observer;
   each aperture of said aperture array formed by channels surrounding a diamond shaped boundary having a first vertex and a non-adjacent second vertex both positioned on a line formed from a midpoint of each said emitter pair to said second surface.

15. The full-depth display of claim 14 where said aperture array is formed from a plurality of parallel structures including at least one of: a cylinder, an ellipse, an oval, or a diamond.

16. An aperture array for a 3D display having a plurality of optical emitters arranged in LT/RT source pairs on a first surface, said optical emitters including a first pair of LT/RT optical emitters adjacent to a second pair of LT/RT optical emitters and a second surface parallel to said first surface and placed a separation distance from said first surface;
   said aperture array being enclosed by a boundary formed by a first line, a second line, a third line, and a fourth line;
   said first line from the rightmost emitting extent of said first LT/RT source pair to a first midpoint centered between said first LT/RT source pair and located on said second surface;
   said second line from the leftmost emitting extent of said second LT/RT source pair to s second midpoint centered between said second LT/RT source pair and located on said second surface;
   said third line from a third midpoint centered between said first LT/RT source pair and said second LT/RT source pair and located on said second surface, to a midpoint of said first LT/RT source pair;
   said fourth line from said third midpoint to a midpoint of said second LT/RT source pair.

17. The aperture array of claim 16 where said aperture array has a surface which is non-reflective.

18. The aperture array of claim 17 where said aperture array has a cross section shape which is at least one of: circular, oval, elliptical, or rectangular.

19. The aperture array of claim 18 where said aperture array is rotated about a y axis.

20. The aperture array of claim 19 where said rotation is substantially 45 degrees, 26.5 degrees, or 18.5 degrees.

* * * * *